Patented Mar. 2, 1954

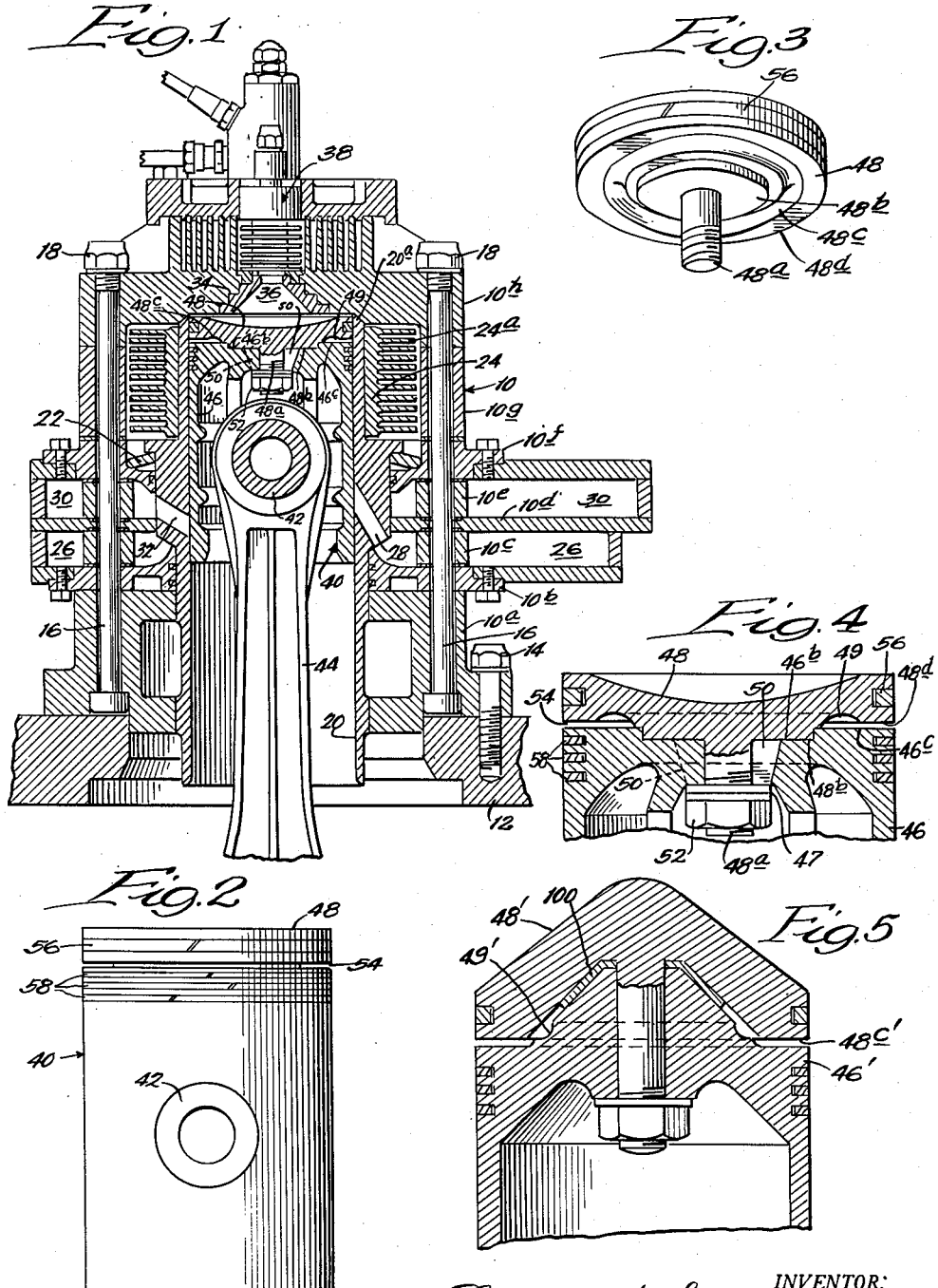

2,670,726

UNITED STATES PATENT OFFICE 2,670,726

INTERNAL-COMBUSTION ENGINE, PISTON FOR USE THEREIN, AND METHOD OF OPERATING SAME

Ernst W. Spannhake, Chicago Heights, Ill., assignor to Barnes & Reinecke, Inc., Chicago, Ill., a corporation of Delaware Application May 9, 1950, Serial No. 160,886

7 Claims. (Cl. 123—193)

My invention relates to an improved internal combustion engine, a piston for use therein, and a method of operating the same characterized by elimination or retardation of the dangerous carbonization normally associated with engine operation and ability to withstand a moderate sealing failure of the main piston rings without damage to other parts.

In internal combustion engines, particularly diesel engines, the deposits of carbonized fuel on the engine surfaces, including the piston, build up during operation and ultimately require cleaning of the engine. These deposits also reduce the efficiency of the engine and may cause sticking of the operating parts. It has been the experience that the formation of a large quantity of sticky deposit resulting from incomplete breakdown of the lubricating oil in an internal combustion engine is primarily associated with the operating temperature of the parts upon which the deposit forms. In accordance with the present invention the deposit of sticky carbon is greatly retarded or eliminated altogether by arranging the piston so that the top face and side portion adjacent to the top ring thereof are maintained at a relatively high temperature sufficient to burn away any carbon deposits, thereby freeing these surfaces from the deposits and retarding or eliminating their formation, whereas the side walls adjacent to the rings below the top ring are maintained at a relatively low temperature which will also eliminate harmful deposits from the lubricating oil.

At the same time the structure of the present invention has the effect of effectively sealing the lower part of the piston which carries the secondary rings against the admission of excessive heat from the piston cap. This gives effective protection against piston sticking due to heat expansion of these rings and also against wrist pin bearing failure due to excessive heat. Sometimes it will eliminate any necessity for additional artificial cooling of the piston, which would have to be resorted to if no heat seal between piston body and piston crown is provided.

A further difficulty associated with pistons having more than one piston ring arises from the failure of the auxiliary ring or rings when the main ring fails, with consequent damage to the main piston and even the cylinder. When the main ring fails in ordinary engines, the resultant blowdown places full cylinder pressure on the auxiliary rings with the consequence that they fail soon after loss of the main ring. In accordance with the present invention this problem is overcome by providing a pressure relief system that is inoperative so long as the main piston ring holds but becomes operative and protects the auxiliary rings when the main ring fails.

It is therefore a general object of the present invention to provide an improved piston and engine construction having unitary means capable of both retarding carbonization on the piston surfaces and preventing failure of the auxiliary piston rings if the main ring fails.

Another object of the present invention is to provide improved means to prevent or retard dangerous carbonization or coking in internal combustion engines.

Still another object of the present invention is to provide an improved internal combustion engine and cylinder therefor wherein failure of the main piston ring does not cause full pressure load to be placed on the auxiliary rings.

Still another object of the present invention is to provide an improved method of operating an internal combustion engine whereby carbonization is retarded or prevented.

Yet another object of the present invention is to provide improved means forming a heat seal between the top of an internal combustion engine piston and the secondary piston rings, wrist pin, and like parts.

The novel features which I believe to be characteristic of the present invention are set forth in the appended claims. My invention itself, however, both as to its organization and method of operation and the characteristics of the process, together with further objects and advantages thereof, will best be understood by reference to the following description taken in connection with the accompanying drawings, in which:

Figure 1 is an axial cross-sectional view of a complete internal combustion engine constructed in accordance with the present invention;

Figure 2 is an enlarged side elevational view of the piston shown in Figure 1;

Figure 3 is a view in perspective of the top cap of the piston of Figures 1 and 2;

Figure 4 is a fragmentary enlarged view of the piston of Figure 1; and

Figure 5 is an axial cross-sectional view of a piston constructed in accord with an alternative embodiment of the present invention.

The structure shown herein is shown and described in my copending patent application entitled Internal Combustion Engine and Cylinder Therefor, Serial No. 140,285, filed January 24, 1950, now Patent No. 2,638,081, and assigned to the same assignee as the present invention, and there claimed in part.

Referring now to Figure 1, there is shown generally at 10 the cylinder block of an internal combustion engine. This structure incorporates the bed plate 12 to which the block proper is anchored by the bolts 14. The cylinder block proper comprises a stack of mating parts 10a, 10b, 10c, 10d, 10e, 10f, 10g and 10h which, when sandwiched together, form the housing for the cylinder-defining elements. Parts 10a to 10h are held together by the elongated bolts 16 which are headed at the bottom thereof and at the top ends receive the nuts 18.

The parts 10a, 10b, 10d, 10f, and 10h define aligned cylindrical surfaces which snugly receive the cylinder liner or sleeve 20. At its upper end this sleeve has a beveled edge 20a which fits in and is received by the mating beveled seat formed in the bottom face of the top or head part 10h. Conical washer 22 holds the sleeve 20 against downward movement in response to piston movement or cylinder pressures.

At its upper portion the sleeve is surrounded by the finned heat dissipating sleeve 24 which carries fins 24a between which cooling air is blown.

Intake air is introduced into the cylinder from the intake manifold 30. This air passes through the ports 32 when they are uncovered by the piston. Similarly, spent gases are exhausted from the cylinder into exhaust manifold 26 through the port 28. As is described in my copending application mentioned above, the ports 28 and 32 are symmetrically disposed about the periphery of the cylinder and cause a circularly symmetrical mushroom-like scavenging flow.

The cylinder head part 10h has a conically stepped central dome 34 which is lined to define the conical combustion chamber 36. Fuel is injected into the compressed air in this chamber in sequence with the piston movement to cause initial burning that creates the initial pressure on the piston face and provides initial mixing of fuel and air.

Fuel is injected into the combustion chamber 36 by the fuel injection mechanism shown generally at 38. This structure is described in detail and claimed in my copending patent application entitled Internal Combustion Engine and Fuel Injector for Use Therewith and assigned to the same assignee as the present invention.

The piston is indicated generally at 40. It fits snugly in the sleeve 20 and executes reciprocating motions during normal operation, the motions being from the upper extreme position shown in Figure 1 to the lowermost extreme position where ports 32 are uncovered.

A wrist pin 42 is centrally disposed transversely of the piston and carries the connecting rod 44 which is attached at its remote end (not shown) to the eccentric bearing of a crankshaft (not shown) so that as the crankshaft rotates, the piston executes reciprocating motions.

The piston is of two part construction divided into a skirt or lower portion, 46, and a cap or upper portion 48. The skirt portion has a bore 46a at its top end which may be surrounded by fins 50, Figure 1. Bore 46a receives the threaded depending stud 48a defined by the cap 48. A nut 52 is in threaded engagement with the stud 48a to hold the cap securely to the skirt 46 by means of an elastic member or washer 47 to allow for expansion of said depending stud and to close the mating faces 48b and 46b of the cap and skirt, respectively. Fins 50 are provided to reduce heat transfer between cap and skirt by restricting the paths of heat flow essentially to the mating faces 48b and 46b.

Outwardly of the face 46b, the skirt 46 defines a flat face 46c which extends to the periphery of the piston as shown. Opposite this face the cap 48 has a complementary annular dome 48c. This dome defines a toroid 49 of substantially semi-elliptical cross-section in conjunction with the face 46c of the skirt portion 46. As is explained in further detail hereafter, this cavity forms a pressure relief space and at the same time defines a heat barrier between the cap 48 and the skirt 46.

Outwardly of the dome 48c, the cap 48 is formed in a flat annular face 48d. This face is spaced from the complementary portion of the upper face 46c of the skirt 46, thereby defining the annular port 54 defining a relatively large cross-section channel of communication between the outer wall of the skirt 46 and the toroidal cavity 49. Due to the direction of heat flow the heat barrier formed by toroid 49 in combination with annular port 54 is very effective on the cylindrical wall of the piston thus giving rise to a sudden jump in temperature across the air-gap of port 54.

The side wall of the cap 48 has an annular groove which receives the main piston ring 56, as shown. As is evident from the drawings, this piston ring is interposed between the acting cylinder space in which combustion occurs and the chamber or cavity 49. The skirt portion 46 of the piston has a series of three spaced annular grooves which receive the three auxiliary piston rings 58. As is evident from the drawings the cavity 49 is interposed between these piston rings and the top ring.

Operation

Having described the structure of an embodiment of the present invention, I will now describe its operation.

In normal operation of the engine, the main piston ring 56 defines a seal between the cap 48 and the cylinder wall. At this time the auxiliary piston rings 58 carry practically no pressure load and serve only to distribute oil on the cylinder wall. Since the ring 56 effectively isolates the cavity 49 from the active cylinder space in which combustion occurs, this cavity exerts no substantial effect on normal engine operation except that it acts as a buffer for the small blowby always occurring through the ring seal.

However, if the amount of blowby past the top or main piston ring 56 is excessive, a path of communication is defined between the active cylinder space and the auxiliary piston rings 58. However, this path of communication is down the annular clearance space between the piston side and the cylinder and is in communication with the port 54 and hence the cavity 49. The expanding cylinder gases accordingly travel into the cavity 49 where they can expand further rather than develop full pressure on the auxiliary piston rings.

I have found that in a practical supercharged diesel engine constructed substantially as shown in the figures, it is possible to lose a substantial portion of the sealing power of the main or upper piston ring 56 without damaging the lower piston rings 58 or harming the piston or cylinder. This is a highly desirable feature of operation, since it is common experience, particularly with engines of this type, to lose an entire cylinder upon failure of the main or upper piston ring. With the engine of the drawings failure of the top ring is always easily detected because of the increasing difficulty of starting the engine from the cold state, since with excessive blowby about the top ring the cavity volume is added to the compression space thus materially reaching total compression pressure.

A further feature of the operation of the engine of the present invention resides in its ability to eliminate or to retard deposit of carbon on the piston. The cap portion 48 of the piston is made of material, such as stainless steel, stellite or similar material, which is characterized by ability to operate at high temperatures and reasonably low thermal conductivity. Since this part of the piston is attached to the skirt portion 46 only by the seating surfaces 46b and 48b and by the fins 50, the path for heat flow between the cap 48 and the skirt 46 has a fairly high thermal resistance, with the consequence that the temperature of the cap 48 is materially greater than the temperature of the skirt 46.

The annular port 54 and the cavity 49 define an effective heat insulating barrier between the cap portion 48 of the piston and the skirt portion 46, thus causing the above-described path of relatively large thermal resistance to be the sole significant path for heat flow between cap 48 and skirt 46.

In operation, the cap 48 is heated to a temperature in excess of the coking temperature of the lubricant and fuel used in the engine. That is, the temperature of the face of the cap 48 in contact with the fuel is sufficiently high to burn off any carbon that may deposit rather than to permit the deposit to accumulate in a sticky form. While it is difficult to fix a precise value of the minimum piston temperature required for this purpose, I have found that operation with a temperature of about 510° F. on a surface of the cylinder opposite the cap displays very little tendency for deposits to form.

On the other hand, the skirt portion 46 of the piston operates at a temperature well below the coking point of the fuel or lubricating oil, since it is thermally isolated from the heated cap 48 and is cooled by the sleeve 20, the lubricating oil, and the air in the crankcase. In general, the surfaces of the skirt portion of the piston should operate below about 350° F., as at this temperature coking or formation of carbon deposits is negligible.

An actual engine, constructed substantially as shown in Figure 1, has been found to operate substantially free of carbon deposits on the piston under the following conditions:

Piston diameter _____ 3⅝ inches.
Piston stroke _____ 4¾ inches.
R. P. M. _____ 1500.
Power output per cylinder _____ 25 H. P.
Cap 48 _____ 25–20 stainless steel.
Skirt 46 _____ Cast iron (mechanite).

This engine also has withstood failures of the main or top piston ring 56 without loss of the auxiliary piston rings 58 or other parts of the mechanism.

While the cavity 49 is shown of toroidal shape with a semi-elliptical cross-section and the port 54 is shown in annular shape, other forms of these parts of the structure may be used if desired. If, for example, it is desired to fix the relative position of the edge of cap 48 more accurately in relation to the top of skirt 46 (and thereby fix the size of the port 54), lips may be provided for this purpose, the lips being of relatively small thickness to minimize heat transfer. Also, the size of the cavity 49 may be enlarged or reduced as desired.

Figure 5 shows an alternative embodiment of the present invention intended for use with a cylinder having a domed head. As shown, the cap 48' of the piston is domed to conform to the shape of the cylinder. Moreover, in the structure of Figure 5 the skirt portion 46' of the piston is grooved annularly at 49' to define a toroidal cavity in conjunction with the cap 48'.

The structure of Figure 5 embodies a further alternative feature of construction in that it incorporates a frusto-conical gasket 100 which is seated between the mating conformations of the cap 48' and the skirt 46' to hold them in predetermined spaced positions to define port 48c' and the toroid 49'. The gasket 100, in addition to acting as a spacer, forms a barrier for heat transfer from the cap 48' to the skirt 46' and thus aids in establishing a sharp temperature differential therebetween.

In the appended claims and the foregoing specification I have used the term toroidal to define broadly the space generated by rotating a plane closed curve about an axis lying in its plane but spaced from the confines of the curve.

While I have shown and described a specific embodiment of the present invention, it will of course be understood that various modifications and alternative constructions may be made without departing from the spirit and scope of my invention and that by the appended claims I intend to cover all variations and alternative embodiments coming within the scope thereof.

What I claim as new and desire to secure by Letters Patent of the United States is:

1. In a piston for an internal combustion engine, the combination comprising a cylindrical skirt equipped with at least one piston ring around its upper end, and a separate cylindrical cap secured to the upper end of said skirt and carrying at least one piston ring therearound, the lowest piston ring around said cap being mounted at a spaced distance above the lower edge of said cap, the outer portions of the adjacent surfaces of said skirt and cap being spaced-apart to provide a pressure-relief cavity, said cavity opening between said cap and skirt at a spaced distance below the lowest piston ring around said cap to receive cylinder gases passing the piston ring around the outside of said cap, whereby said cap can be operated at a temperature above the coking temperature range of the fuel, while at all times protecting the piston rings around said skirt from having excessive gas pressure exerted thereon.

2. In a piston for an internal combustion engine, the combination comprising a cylindrical skirt equipped with a plurality of auxiliary piston rings around its upper end, and a separate cylindrical cap secured to the upper end of said skirt and carrying a main piston ring therearound, said main piston ring being mounted at a spaced distance above the lower edge of said cap, the outer portions of the adjacent surfaces of said skirt and cap being spaced-apart to provide an annular pressure-relief cavity, said cavity opening between said cap and skirt at a spaced distance below the piston ring around said cap, to receive cylinder gases passing the main piston ring around the outside of said cap, whereby said cap and the main piston ring therearound can be operated at a temperature above the coking temperature range of the fuel, while at all times protecting the auxiliary piston rings around said skirt from having excessive gas pressure exerted thereon.

3. The combination of claim 2 in which there is also provided means for limiting the transfer of heat from said cap to said skirt inwardly of said annular cavity.

4. In a piston for an internal combustion engine, the combination comprising a cylindrical skirt with at least one piston ring around its upper end, and a separate cylindrical cap secured to the upper end of said skirt and carrying a piston ring therearound, the lowest piston ring around said cap being mounted at a spaced distance above the lower edge of said cap, the outer portions of the adjacent surfaces of said skirt and cap being spaced-apart to provide an inward pressure-relief cavity and a passage of reduced cross-sectional area communicating with said cavity and opening between said cap and skirt at a spaced distance below the lowest piston ring around said cap, said passage and cavity receiving cylindrical gases passing the piston ring around the outside of said cap and thereafter exhausting the gases from said cavity at a velocity sufficient to clean out said passage, whereby said cap can be operated at a temperature above the coking temperature range of the fuel, while at all times protecting the piston rings around said skirt from having excessive gas pressure exerted thereon.

5. The combination of claim 4 in which there is also provided means for limiting the transfer of heat from said cap to said skirt inwardly of said annular cavity.

6. In an internal combustion engine, the combination comprising a cylinder closed at one end and equipped with at least one exhaust port in the side wall thereof at a spaced distance from said closed end, a piston within said cylinder mounted to reciprocate therein so that in its outermost position the top of said piston is outside of said exhaust port, said piston including a cylindrical skirt equipped with at least one piston ring around its inner end, and a separate cylindrical cap secured to the inner end of said skirt and carrying at least one piston ring therearound, the lowest piston ring around said cap being mounted at a spaced distance above the lower edge of said cap, the outer portions of the adjacent surfaces of said skirt and cap being spaced-apart to provide an inward pressure-relief cavity and a passage of reduced cross-sectional area communicating with said cavity and opening between said cap and skirt at a spaced distance below the lowest piston ring around said cap and at a point passing over said exhaust port during the outward reciprocation of said piston, said passage and cavity receiving cylinder gases passing the piston ring around said cap and thereafter exhausting these gases into said exhaust port at a sufficient velocity to clean out said passage, whereby said cap can be operated at a temperature above the coking temperature range of the fuel, while at all times protecting the piston rings around said skirt from having excessive gas pressure exerted thereon.

7. In an internal combustion engine, the combination of a cylinder closed at one end and equipped with at least one exhaust port in the side wall thereof at a spaced distance from said closed end, a piston within said cylinder mounted to reciprocate therein and arranged so that in its outermost position the top of said piston is outside of said exhaust port, said piston including a cylindrical skirt equipped with a plurality of piston rings around its inner end, and a separate cylindrical cap secured to the end of said skirt and carrying a main piston ring therearound, said main piston ring being mounted at a spaced distance above the lower edge of said cap, the outer portions of the adjacent surfaces of said skirt and cap being spaced apart to provide an annular pressure relief cavity, said cavity opening between said cap and skirt at a spaced distance below the piston ring around said cap and at points passing over said exhaust port during the outward reciprocation of said piston, said main piston ring during the operation of said engine normally being in considerably looser engagement with the walls of said cylinder than the piston rings around said skirt, whereby said main piston ring can be maintained at a temperature above the coking temperature range of the fuel without sticking, while at the same time gases leaking past said main piston ring are temporarily diverted into said pressure relief cavity, thereby protecting the piston rings around said skirt.

ERNST W. SPANNHAKE.

References Cited in the file of this patent

UNITED STATES PATENTS

| Number | Name | Date |
|---|---|---|
| 1,089,823 | Day et al. | Mar. 10, 1914 |
| 1,222,147 | Setz | Apr. 10, 1917 |
| 1,506,252 | Pondelick | Aug. 26, 1924 |
| 1,787,119 | Noble | Dec. 30, 1930 |
| 1,978,816 | Pollister | Oct. 30, 1934 |
| 1,980,658 | Blettner | Nov. 13, 1934 |
| 2,104,347 | Larkin | Jan. 4, 1938 |
| 2,109,735 | Rosen | Mar. 1, 1938 |
| 2,323,074 | Neugebauer et al. | June 29, 1943 |
| 2,447,508 | Kleinfeld | Aug. 24, 1948 |

FOREIGN PATENTS

| Number | Country | Date |
|---|---|---|
| 362,811 | Germany | Nov. 2, 1922 |